(12) United States Patent
Mezits et al.

(10) Patent No.: US 6,974,109 B1
(45) Date of Patent: Dec. 13, 2005

(54) APPARATUS FOR SEALING AND RESTRAINING THE FLEXIBLE PRESSURE BOUNDARY OF AN INFLATABLE SPACECRAFT

(75) Inventors: John Mezits, Las Vegas, NV (US); Russell J. Common, Henderson, NV (US); John A. Rusi, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 1107 days.

(21) Appl. No.: 09/775,257

(22) Filed: Jan. 31, 2001

(51) Int. Cl.$^7$ .............................................. B64G 1/52
(52) U.S. Cl. ........................... 244/158.3; 244/158 R; 244/171.7
(58) Field of Search .................... 244/158 R, 159, 244/163, 158 A, 24, 31, 33; 24/439, 287, 24/457, 458, 483, 484, 522; 49/91.1, 91.2, 49/477.1; 285/106, 336, 917, 363, 108, 109; 60/251, 253, 255

(56) References Cited

U.S. PATENT DOCUMENTS

| 2,375,507 A | * | 5/1945 | Van Tuyl et al. ............. 24/483 |
| 3,661,693 A | * | 5/1972 | Pierson ....................... 428/123 |
| 3,686,721 A | * | 8/1972 | Nelson ......................... 24/304 |
| 4,308,309 A | * | 12/1981 | Leiser et al. ................ 428/193 |
| 4,310,161 A | * | 1/1982 | Streich ........................ 277/334 |
| 4,699,335 A | * | 10/1987 | DeOms et al. ........... 244/129.3 |
| 4,705,235 A | * | 11/1987 | Regipa ......................... 244/31 |
| 4,848,806 A | * | 7/1989 | Miller ......................... 285/106 |
| 4,911,380 A | * | 3/1990 | Regipa ......................... 244/31 |
| 5,429,851 A | * | 7/1995 | Sallee .......................... 428/71 |
| 5,560,569 A | * | 10/1996 | Schmidt .................. 244/117 R |
| 6,547,189 B1 | * | 4/2003 | Raboin et al. .............. 244/159 |
| 6,568,640 B1 | * | 5/2003 | Barnett ....................... 244/173 |
| 2003/0150959 A1 | * | 8/2003 | Cleveland ............... 244/158 R |

OTHER PUBLICATIONS

NASA FACTS, "The Transhab Module: An Inflatable Home in Space", National Aeronautics and Space Administration, dated May 1999, IS-199-05-ISS027JSC.

"Deployable Lunar Habitat Design and Materials Study, Phase I Study Program Results", National Aeronautics and Space Administration, dated Jan. 29, 1997, Contract/P.O. No. T-357-5V.

Inflatable Composite Habitat Structures For Lunar And Mars Exploration, D. Cadogan, J. Stein, M. Grahne, ILC Dover, Inc. paper presented at the 49$^{th}$ International Astronautical Congress, Sep. 28-Oct. 2, 1998, IAA-98-IAA.13.2.04.

\* cited by examiner

*Primary Examiner*—Teri Pham Luu
*Assistant Examiner*—Stephen A. Holzen
(74) *Attorney, Agent, or Firm*—Franklin E. Gibbs

(57) ABSTRACT

The present invention provides a sealing and restraint apparatus to establish a pressure boundary for inflatable or expandable spacecraft. The apparatus is capable of connecting the flexible pressure boundary of an inflatable spacecraft to the rigid structure of the spacecraft. The flexible pressure boundary of the present invention comprises a gas membrane and a restraint layer. The gas membrane minimizes air leakage. The restraint layer carries the forces created by the internal pressurization of the spacecraft. This apparatus provides a hermetic seal and the structural integrity necessary to resist internal pressurization forces.

20 Claims, 3 Drawing Sheets

APPARATUS FOR SEALING AND RESTRAINING THE FLEXIBLE PRESSURE BOUNDARY OF AN INFLATABLE SPACECRAFT

BACKGROUND OF THE INVENTION

1. Field of the Invention

The present invention relates to the field of seal and restraint systems for the establishment of a pressure boundary on inflatable or expandable structures in a vacuum environment. In particular, the present invention relates to the establishment of a pressure boundary between the flexible and the rigid materials of construction utilized on inflatable spacecraft such as orbiting satellites, space stations, and space vehicles, or any other type of space habitat.

2. Discussion of the Prior Art

Inflatable structures for use in space applications utilize flexible, non-rigid materials of construction to develop and maintain an inflatable pressure boundary over a substantial portion of their structure. Augmenting these non-rigid materials of construction are rigid materials that are necessary to form such components as hatches and docking mechanisms. A long-standing problem has been the development of a means to connect the non-rigid, flexible materials of construction to the spacecraft's rigid structural components to establish a substantially air tight pressure boundary. Compounding this problem is the lack of any single material that has both the requisite gas impermeability, and the strength needed to withstand internal pressurization forces.

Because of a lack of a single suitable material, both a gas membrane and a restraint layer are required to establish an effective pressure boundary. The gas membrane is interior to the restraint layer and is typically a polymeric sheet material. This polymer is substantially impermeable to atmospheric gases to minimize air leakage into space. The restraint layer carries and distributes the internal pressurization loads imposed by the gas membrane.

The prior art has been unable to develop a fully satisfactory method to effectively establish a pressure seal between a flexible pressure barrier and a rigid component. It is the connection of the gas membrane and the restraint layer to the spacecraft's rigid structural components that has proven to be problematic. The best that the prior art has been able to accomplish is the development of a vise like connection mechanism that clamps both the gas membrane and the restraint layer to the rigid structural components of the spacecraft.

This prior art connection has several shortcomings that prevent the full and economic utilization of inflatable spacecraft. One of the most significant deficiencies is that the clamp mechanism must exert tremendous compressive force on the restraint layer and the gas membrane. This compressive force is necessary to resist the pull out forces caused by the spacecraft's internal pressurization. These pull out forces in turn create shear stresses in both the restraint layer and the gas membrane.

The gas barrier, because of the special polymeric sheet materials needed to prevent air leakage, is generally thin, delicate, and prone to a variety of stress failure mechanisms. The clamp compressive forces and the induced shear stresses are sufficient to distort and damage not only the gas membrane, but also the restraint layer. Although the restraint layer is made from very strong materials, the threads from which these fabrics are woven can still be damaged by the clamp mechanism. Because of these compressive and shear forces, the load rating of the restraint layer is degraded. Consequently, the prior art vise like clamping mechanism is a poor method for connecting the gas membrane and restraint layer to the spacecraft's rigid structural components.

In addition to the clamping stresses that are directly imposed on the gas membrane, the restraint layer itself induces stresses in the gas membrane. As noted above, the prior art clamps the restraint layer and gas membrane together in a vise like grip. This causes the restraint layer and the gas membrane to act like a single component. This results in the transfer of forces from the restraint layer to the gas membrane. The interface of the highly stressed restraint layer with the gas membrane can cause a failure several ways.

The first failure mode results from the transfer of tensile forces in the restraint layer to the gas membrane, causing the gas membrane to be placed in tension. This tensile stress further induces shear stresses in the gas membrane because of the restraint imposed by the clamp. The gas membrane can then fail in either tension or shear.

The gas membrane may also fail as a result of fatigue. Constantly fluctuating spacecraft air pressure can cause alternating stresses in the restraint layer that are transferred to the gas membrane. The constant movement of the restraint layer against the gas membrane may cause fatigue failure of the gas membrane. The gas membrane may also fail due to abrasion caused by the relative movement of the restraint layer against the gas membrane.

Another problem with the prior art design relates to the effectiveness of the air seal created by the clamping mechanism and the gas membrane. Because both the gas membrane and the restraint layer are clamped together, (back to back against an o-ring) sufficient compressive forces may not be available to ensure a leak tight seal. This is a result of the relatively thick, deformable nature of the restraint layer and its susceptibility to creep under a compressive load. Because of deformation and creep, the restraint layer continues to flow away from the location of the imposed compressive force. Consequently, the compressive force against the o-ring is gradually reduced, and the hermetic seal is degraded or lost.

Internal air pressurization further contributes to seal degradation. Internal air pressure works between the gas membrane and the o-ring, urging the gas membrane off the o-ring and reducing the effectiveness of the seal. Compounding this problem is the potential for the development of wrinkles in the restraint layer fabric. These wrinkles may propagate over the gas membrane and the o-ring seal. Air pressure may then force the gas membrane off the o-ring and into the wrinkled area of the restraint layer, thus forming an air leakage pathway.

A similar prior clamping connection is shown for an inflatable lunar habitat as discussed in "Deployable Lunar Habitat Design and Materials Study, Phase I Study Program Results", developed for the NASA Johnson Space Center. The inflatable habitat discussed in the NASA report differs from the present invention in at least one other profound respect. The habitation has a fixed, unexpandable diameter that only allows axial expansion.

The inability of the prior art design to expand diametrically severely restricts the principal advantage of inflatable spacecraft technology. That is, the ability to minimize the volume of the launch package, and maximize the deployed inflated volume. In fact, the diameter of the launch vehicle is generally the limiting dimension for almost all launch payloads. The inability to utilize the prior art to obtain an expansible diameter is an additional handicap that undermines the development of inflatable spacecraft. Consequently, a new connection mechanism is needed to provide an inflatable spacecraft with an expansible diameter.

In summary, the prior art designs are inadequate to provide a reliable and effective pressure boundary. As noted above, the prior art seal and restraint system subjects the restraint layer and the gas membrane to excessive stresses that can damage either or both of these components and result in structural failure. The prior art also allows excessive air leakage losses between the gas membrane and the o-ring. Furthermore, the prior art does not allow the gas membrane layer to be replaced without disassembling the restraint layer. For all of these reasons, the prior art design is inadequate, and a new sealing and restraint system is needed to make inflatable space structures economical and reliable.

SUMMARY OF THE INVENTION

The present invention provides a novel apparatus for establishing an effective seal and restraint system that can anchor a flexible pressure boundary to the rigid structure of an inflatable spacecraft. The importance of the present invention is that it can establish a substantially hermetic seal between a flexible pressure boundary and a rigid structure with sufficient strength to allow the spacecraft to operate in a vacuum while internally pressurized.

The present invention establishes a pressure boundary using both a restraint layer and a gas membrane that cooperatively act to seal and restrain the pressure boundary to the spacecraft's rigid structural components. No significant tensile stresses are imposed on the gas membrane because it is oversized and located inside the restraint layer volume in which it is constrained.

The present invention uses separate attachment connections for the gas membrane and the restraint layer. The separation of these two attachment mechanisms isolates the sealing system from the restraint system, while at the same time allows the gas membrane to interact with the restraint layer over the remainder of the gas membrane surface area.

The gas membrane attachment mechanism establishes a substantially air tight seal, while imposing negligible stresses on the gas membrane. This has been accomplished using a free floating compression seal, which traps the gas membrane between at least one elastomeric seal (e.g., o-ring seals) and a flange, or preferably, between a pair of elastomeric seals. The only forces exerted on the gas membrane are the compression stresses at the seal contact point. This seal isolates the gas membrane from tensile stresses while providing a very effective pressure seal. This allows the gas membrane to float between the seals, thereby preventing any significant stresses from developing on the gas membrane.

The restraint layer attachment mechanism prevents crushing of the restraint layer and minimizes stress concentration factors while evenly distributing the restraint layer loads to the spacecraft's rigid structural components. Loops at the ends of the restraint layer transfer internal pressurization loads to a retaining member in the rigid spacecraft structure. The restraint layer loops are free to pivot about the retaining member to minimize stresses on the loops and the restraint layer. If desired, an anti-chafing protective sleeve can be placed over the loop to prevent abrasion damage to the restraint layer loops. The retaining member itself is trapped between two flanges that allow the retaining member to evenly transmit the restraint layer forces into the mating flanges.

From the brief summary provided above it can be seen that the present invention provides many advantages over the prior art and has the following specific objects:

One of the objects of the present invention is to provide a substantially leak tight seal between the gas membrane and its connection point to the spacecraft's rigid structural components without unduly stressing the gas membrane. This has been accomplished using a free floating compression seal.

Another object of the present invention is to provide a more effective air seal by eliminating the restraint layer to gas membrane interface found in the prior art. The present invention eliminates this interface, establishing two separate anchoring mechanisms for the gas membrane and the restraint layer.

Another object of this invention is to minimize mechanical damage to the restraint layer at the connection point to the rigid structure. This has been accomplished in the present invention using a plurality of restraint loops placed around a retaining member held in place by a flange assembly.

In summary, the present invention minimizes air leakage, maximizes gas membrane service life, minimizes stresses imposed on the gas membrane and restraint layer, provides a diametrically expansible structure, and allows the gas membrane to be replaced without removing the restraint layer. These are all significant technical advancements over the prior art. The technological advancements of the present invention substantially increase the commercial viability of inflatable spacecraft.

DETAILED DESCRIPTION OF THE PREFERRED EMBODIMENTS

Preferred embodiments of the present invention that illustrate the best modes now contemplated for placing the invention in practice are described as follows, and in conjunction with the attached drawings that form a part of this specification. The preferred embodiments are described in detail without attempting to show all of the various forms and modifications in which the present invention may be embodied. The preferred embodiments described are illustrative, and as will become apparent to those skilled in the arts, can be modified in numerous ways within the spirit and scope of the invention, the invention being measured by the appended claims and not by the details of the specification.

Figure 1:
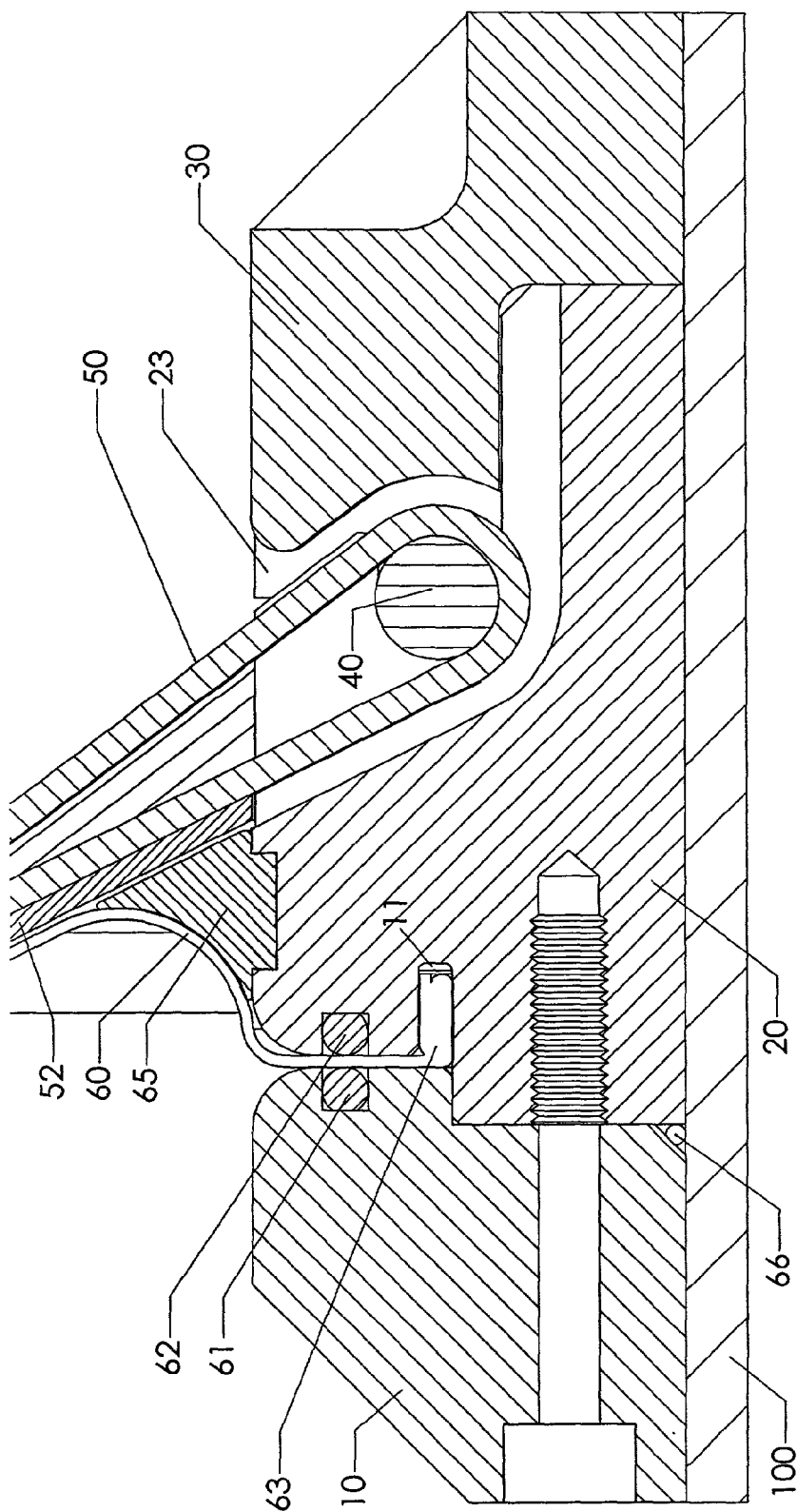
FIG. 1 is a cross sectional view of the pressure barrier seal and restraint apparatus.
Figure 2:
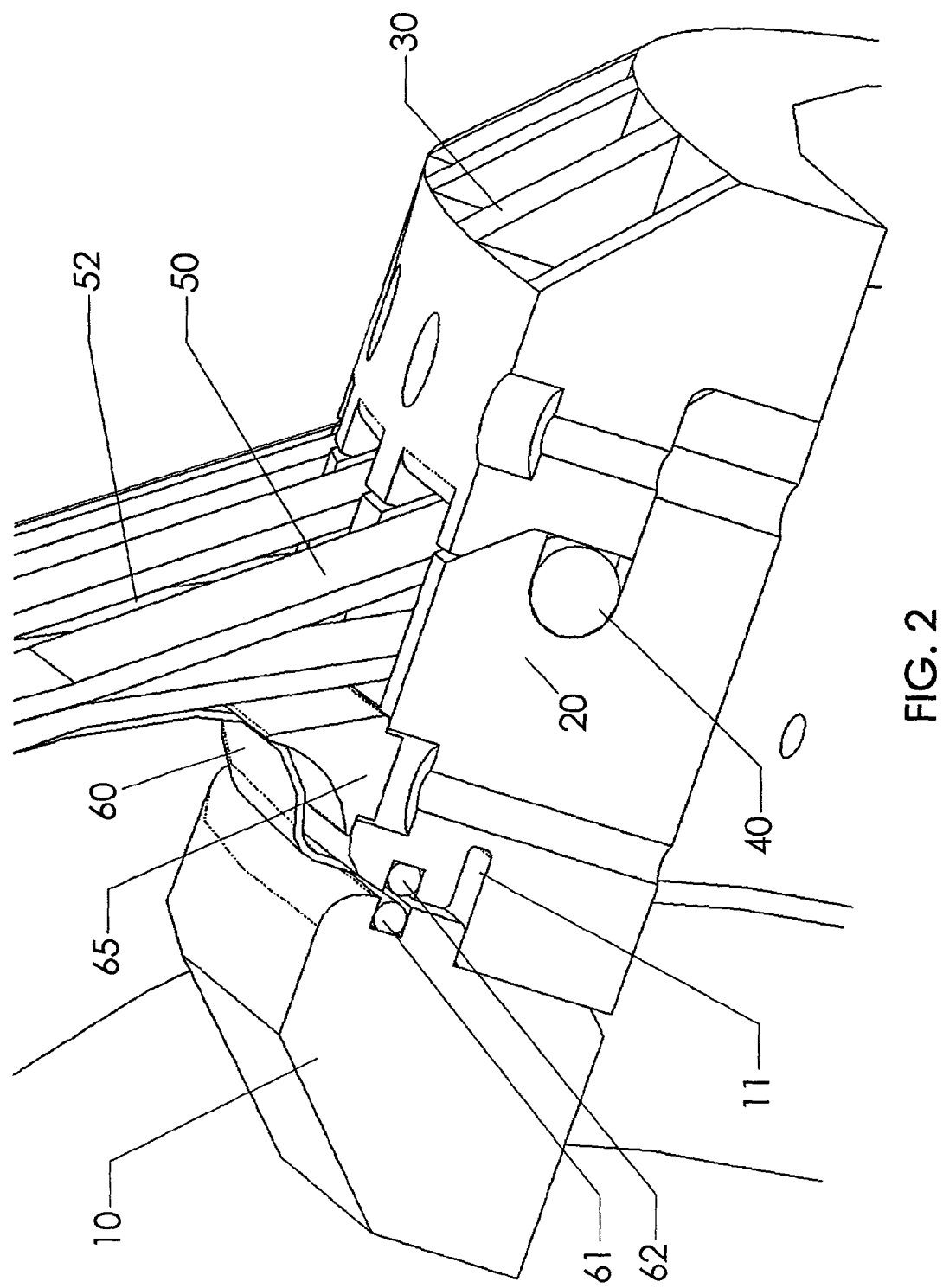
FIG. 2 is an isometric view of the pressure barrier seal and restraint apparatus.
Figure 3:
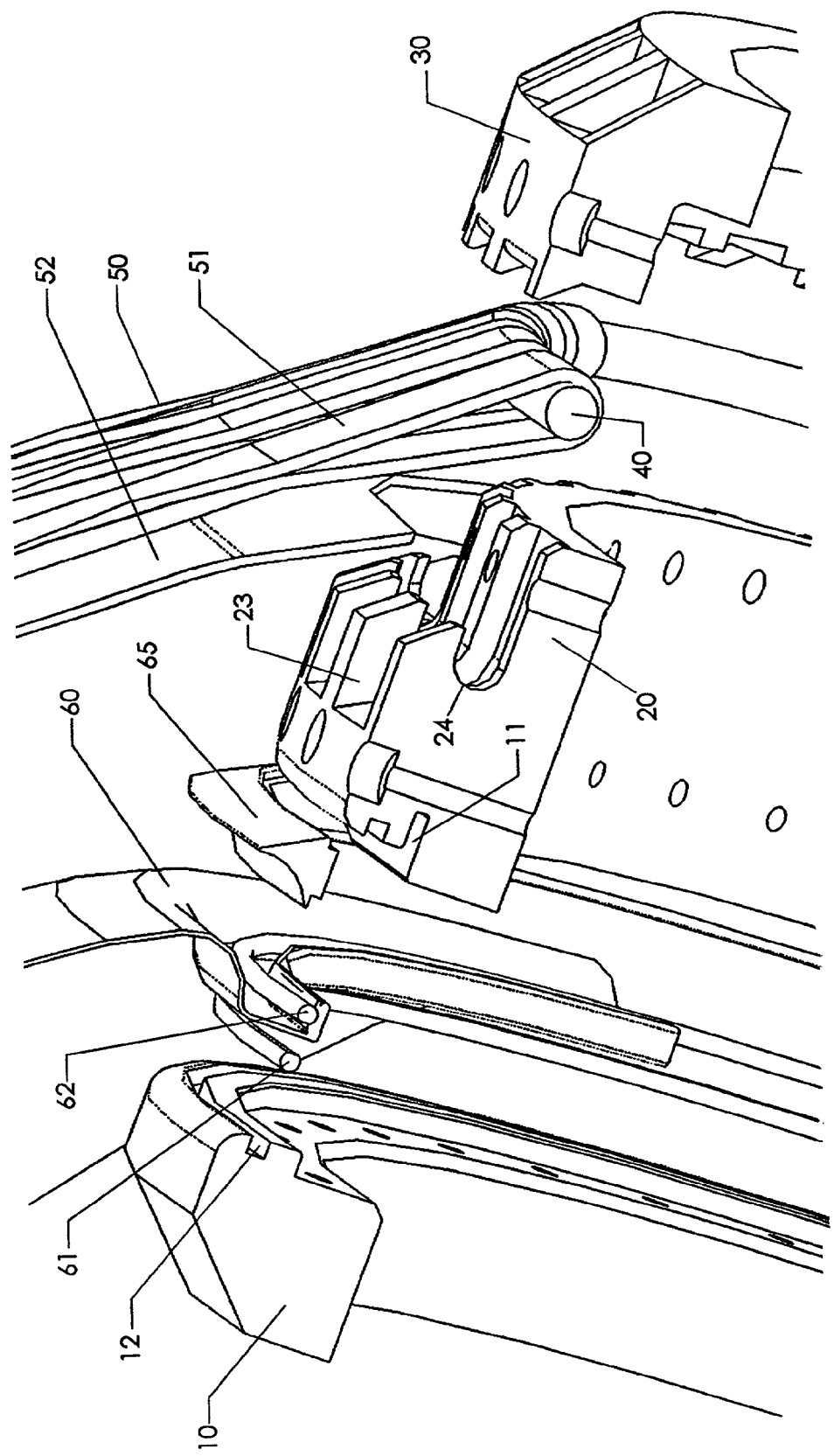
FIG. 3 is an exploded isometric view of the pressure barrier seal and restraint apparatus.

The present invention is a restraint and sealing system for use in inflatable space structures that utilizes a flexible, non-rigid pressure boundary. Examples of the construction techniques utilized in the development of these inflatable space structures is provided in Deployable Lunar Habitat Design and Materials Study, Phase I Study Program Results", developed for the NASA Johnson Space Center, under Purchase Order #T-357-5V, hereby incorporated by reference. FIG. 1, FIG. 2, and FIG. 3 depict the present invention with the seal and restraint system, as it would be installed in a typical inflatable spacecraft. The present invention utilizes a gas membrane 60 and a restraint layer 50. The gas membrane provides an air seal against the vacuum of space. The restraint layer contains the internal pressurization forces created by the pressure differential between the vacuum of space and the space structure's internal pressure. The gas membrane and the restraint layer work, function, and interact cooperatively to form the pressure boundary of the spacecraft.

The gas membrane 60 is typically composed of polymeric sheet material, and is inside the restraint layer volume. The gas membrane is independently attached to the rigid spacecraft structure between a seal flange 10 and the base flange 20 to establish a substantially hermetic seal. The gas membrane is oversized so that its fits loosely inside the restraint layer 50. This allows the gas membrane to expand against the restraint layer 50, transferring the internal pressurization forces to the restraint layer. This configuration minimizes tensile and shear loads on the gas membrane. Although this places the gas membrane in compression, as with most materials, polymeric materials are able to withstand compressive forces quite readily. This load configuration is critical, because the gas membrane is generally thin and delicate. Consequently, the gas membrane must be fully supported over its entire surface area to prevent its extrusion through the restraint layer.

To ensure that the gas membrane 60 is not extruded through the restraint layer 50, some restraint layer designs may require a carrier layer 52. The carrier layer is preferably attached to the restraint layer, although it may be attached to the gas membrane, or simply placed between the gas membrane and the restraint layer. The carrier layer 52 covers any voids or discontinuities that may be present in the restraint layer. The carrier layer 52 prevents the extrusion of the gas membrane and provides the added benefit of providing a smoother surface for the gas membrane to push against, minimizing stresses and abrasion on the gas membrane.

In the preferred embodiment, the gas membrane 60, to be fully protected from the hard surfaces at the attachment point, is sandwiched between elastomeric seals, such as o-rings 61, 62. These o-rings may ride in a groove provided on the mating face of the seal flange and the second face of the base flange. These o-rings substantially isolate the gas membrane from potentially damaging attachment point stresses. The only stresses imposed by the o-rings are compressive stresses on the trapped portion of the gas membrane. It is this compression seal that provides a substantially airtight seal between the rigid spacecraft structure and the gas membrane. If desired, to simplify the design of the sealing system, a single seal may be used to trap the gas membrane between the seal and either the mating face of the seal flange 10 or the second face of the base flange 20. This configuration although simpler, has the potential for significantly more wear on the gas membrane.

Normally, the internal pressurization forces the gas membrane to conform against the restraint layer, preventing the gas membrane from slipping out from between the seals. A deadman may be used, if desired, to ensure that the gas membrane is not accidentally pulled from between the o-ring seals. This feature provides positive backup to prevent the possible retraction of the gas membrane from between the seals.

The deadman 63 may be formed by doubling the gas membrane 60 to form a substantially thicker portion at the edges of the gas membrane. This increased thickness may be heat sealed, sewn, or otherwise maintained in place. Alternately, a rigid member may be attached to the gas membrane 60 to form the deadman. The deadman may be placed in the cavity 11 formed between the mating face of the seal flange 10 or the second face of the base flange 20. Although the deadman 63 fits into cavity 11, it cannot be extruded because the deadman is larger than the clearance between the base flange 20 and the seal flange 10.

The restraint layer 50 is typically made from polymeric materials such as Kevlar or Vectran. These materials are typically woven to provide a high strength, yet flexible material. The restraint layer may take many different forms and shapes. For example, the restraint layer may be made from sheet materials, straps, or formed using a basket weave type construction. The restraint layer may take on any form, use any type of construction, or be made from any material, provided that the restraint layer has the ability to be expand from a collapsed position into a fully deployed position when inflated.

The restraint layer 50 is connected to the rigid spacecraft structure to form an enclosure within which the gas membrane is contained. The restraint layer, in a substantially cylindrical structure, experiences stresses that are essentially equivalent to the standard hoop, axial, and shear stresses associated with any cylindrical pressure vessel. The restraint layer must be connected to a rigid structure in a way that allows the stresses to be evenly and uniformly distributed, throughout the restraint layer as well as the rigid structure.

To uniformly distribute the internal pressurization forces, the present invention utilizes a retaining member 40. The retaining member is held in place with a base flange 20 and a locking flange 30. The first face of the base flange 20, in conjunction with the mating face of the locking flange 30, contact to create a series of recesses 23. The recesses 23 extend from under the retaining member, and exit through the outer surface around the circumference of the base flange 20 and the locking flange 30 at their interface. Located between each of these recesses is a passage 24 that connects to, and is in communication with each adjacent recess. These passages are for capturing the retaining member 40.

Connected to the restraint layer 50 is a plurality of loops 51 that are attached at one end to the restraint layer, and at the other end attached to the retainer member. The restraint layers loops 51 fit inside the recesses and extend around the retaining member 40. The restraint layer loops uniformly distribute the stresses in the restraint layer to the retaining member. The retainer member, by virtue of its continuity around the mating flanges distributes the restraint layer loads uniformly around and into the rigid structure. The retaining member and enclosing flanges minimize abrasion, fatigue, and stresses on the restraint layer 50 or the restraint layer loops 51.

Even with the carrier layer, additional protection for the gas membrane may be desirable at the point where the restraint layer loops enter their respective recesses. To ensure that the gas membrane is not pinched between the loops and the flanges, or otherwise extruded between the loops, a dam 65 may be placed around the outer circumference of the base flange, between the restraint layer and the gas membrane. The dam 65 may be captured in a groove around the base flange. Alternately, bolt hole recesses around the circumference of the base flange may be used to hold the dam. This provides the further benefit of protecting the gas membrane from the discontinuities presented by the bolt heads.

The dam diverts the gas membrane away from the recesses and prevents the extrusion of the gas membrane. The dam is preferably made from a compressible elastomeric material, allowing the force of the gas membrane to compress the dam against the restraint layer. The conformance of the dam to the restraint layer ensures the elimination of any spacing between the dam and the restraint layer, preventing the pinching or extrusion of the gas membrane.

The retaining member 40 itself may be formed from separable components to allow the loops in the restraint layer to be preformed, ready for assembly. During assembly, the restraint layer loops are placed around the retaining member, and the retaining member may be assembled into a single component. The retaining member 40 is in turn placed between the base flange 20 and the locking flange 30. The locking flange and the base flange are connected together to trap the retaining member. Similarly, the seal flange and the base flange are connected together to form the compression seal holding the gas membrane. The entire assembly may then form an opening for a spacecraft hatch, bulkhead, or docking mechanism.

Although it is not necessary, the flange assembly (base flange, the locking flange, and the seal flange) may be further attached around a rigid member 100 to build upon the spacecraft's structure. There is an o-ring 66 between the rigid member 100 and the base flange 20. The rigid member 100 may be hollow to provide access for a hatch, docking mechanism, or view port. Alternately, the ends of the base flange 20 may be extended to take the form of rigid member 100. However, neither the rigid member, nor extension of the base flange is necessary, and only represent different embodiments of the present invention with greater structural rigidity.

In summary, the present invention described herein provides a very low leakage seal and restraint system that can be used to establish and maintain the pressure boundary around an inflatable spacecraft. Although the present invention has been described above with reference to certain preferred embodiments, it is understood that modifications and variations are possible within the scope of the appended claims that follow. Among these variations is the potential to use the present invention to affix the pressure boundary using a single retainer member to form a single opening in the flexible pressure boundary. Alternately, multiple retainer members may be used to form any number of openings for hatches, docking mechanisms, or viewing ports.

We claim:

1. Apparatus for sealing and retraining the flexible pressure boundary of an inflatable spacecraft comprising:
   a. a gas membrane;
   b. a restraint layer;
   c. a retaining member;
   d. a plurality of loops, one end of said loops extending around said retaining member, the other end of said loops connected to said restraint layer;
   e. a base flange having a first face and a second face, said base flange further having an outer surface around the circumference of the base flange;
   f. a locking flange having a mating face, said locking flange further having an outer surface around the circumference of the locking flange, said locking flange connected to said base flange, the first face of said base flange and the mating face of said locking flange contacting to form a plurality of recesses, said recesses extending from around the retaining member to the outer surface of said base flange and said locking flange to form an opening between said locking flange and said base flange, said base flange and said locking flange further forming a plurality of passages, each said passage disposed between and in communication with an adjacent pair of said recesses, said passages for capturing said retaining member, said recesses to accommodate said loops to allow said loops to extend around said retaining member; and
   g. a seal flange, said seal flange having a mating face, said seal flange connected to said base flange, the mating face of said seal flange and the second face of said base flange in facing relationship, said gas membrane captured between the mating face of said seal flange and the second face of said base flange.

2. The apparatus as described in claim 1 further comprising a seal, said seal protruding from the mating face of said seal flange to capture said gas membrane between said seal and the second face of said base flange.

3. The apparatus as described in claim 1 further comprising a seal, said seal protruding from the second face of said base flange to capture said gas membrane between said seal and the mating face of said seal flange.

4. The apparatus as described in claim 1 further comprising:
   h. a first seal, said first seal protruding from the mating face of said seal flange; and
   i. a second seal, said second seal protruding from the second face of said base flange, said first seal and said second seal in facing relationship to allow said gas membrane to be compressed between said first seal and said second seal.

5. The apparatus as described in claim 4 further comprising a dam, said dam connected around the circumference of the base flange between the gas membrane and the restraint layer.

6. The apparatus as described in claim 5 further comprising a carrier layer, said carrier layer disposed between said restraint layer and said gas membrane, said carrier layer to provide a substantially uninterrupted surface against which said gas membrane is urged.

7. The apparatus as described in claim 6 wherein said carrier layer is attached to said restraint layer.

8. The apparatus as described in claim 6 further comprising:
   a. a deadman, said deadman attached to said gas membrane; and
   b. a cavity, said cavity formed from the contacting of the mating face of said seal flange with the second face of said base flange, said deadman disposed in said cavity.

9. The apparatus as described in claim 1 further comprising a rigid member, said base flange connected to the exterior of said rigid member.

10. The apparatus as described in claim 4 further comprising a rigid member, said base flange connected to the exterior of said rigid member.

11. Apparatus for sealing and restraining the flexible pressure boundary of an inflatable spacecraft comprising:
   a. a gas membrane;
   b. a restraint layer, said restraint layer extending to form a plurality of loops at the distal ends of said restraint layer;
   c. a retaining member;
   d. a base flange having a first face and a second face, said base flange further having an outer surface around the circumference of the base flange;
   e. a locking flange having a mating face and an outer surface around the circumference of the locking flange, said locking flange connected to said base flange, the first face of said base flange and the mating face of said locking flange contacting to form a plurality of recesses, said recesses extending from around the retaining member to the outer surface of said base flange and said locking flange to form an opening between said locking flange and said base flange, said base flange and said locking flange further forming a plurality of passages, each said passage disposed between and in communication with an adjacent pair of said recesses, said passages for capturing said retaining member, said recesses to accommodate said loops to allow said loops to extend around said retaining member; and f. a seal flange, said seal flange having a mating face, said seal flange connected to said base flange, the mating face of said seal flange and the second face of said base flange in facing relationship, said gas membrane captured between the mating face of said seal flange and the second face of said base flange.

12. The apparatus as described in claim 11 further comprising a seal, said seal protruding from the mating face of said seal flange to capture said gas membrane between said seal and the second face of said base flange.

13. The apparatus as described in claim 11 further comprising a seal, said seal protruding from the second face of said base flange to capture said gas membrane between said seal and the mating face of said seal flange.

14. The apparatus as described in claim 11 further comprising:
   a. a first seal, said first seal protruding from the mating face of said seal flange; and
   b. a second seal, said second seal protruding from the second face of said base flange, said first seal and said second seal in facing relationship to allow said gas membrane to be compressed between said first seal and said second seal.

15. The apparatus as described in claim 14 further comprising a dam, said dam connected around the circumference of the base flange between the gas membrane and the restraint layer.

16. The apparatus as described in claim 15 further comprising a carrier layer, said carrier layer disposed between said restraint layer and said gas membrane, said carrier layer to provide a substantially uninterrupted surface against which said gas membrane is urged.

17. The apparatus as described in claim 16 wherein said carrier layer is attached to said restraint layer.

18. The apparatus as described in claim 16 further comprising:
   a. deadman, said deadman attached to said gas membrane; and
   b. a cavity, said cavity formed from the contacting of the face of said seal flange with the second face of said base flange, said deadman disposed in said cavity.

19. The apparatus as described in claim 11 further comprising a rigid member, said base flange connected to the exterior of said rigid member.

20. The apparatus as described in claim 14 further comprising a rigid member, said base flange connected to the exterior of said rigid member.

\* \* \* \* \*